May 23, 1933. W. H. BOUTELLE 1,910,460
GOGGLES
Filed May 5, 1930
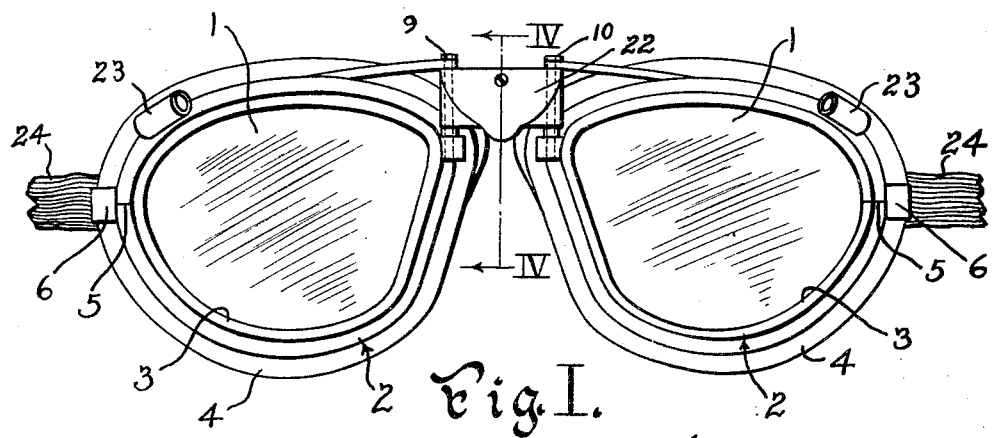
Fig. I.
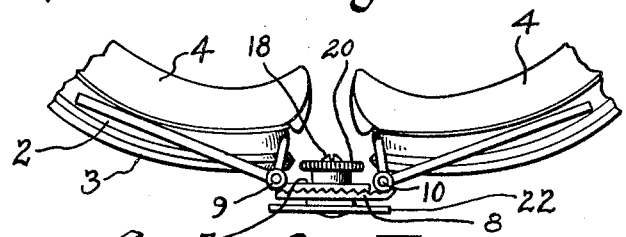
Fig. II.
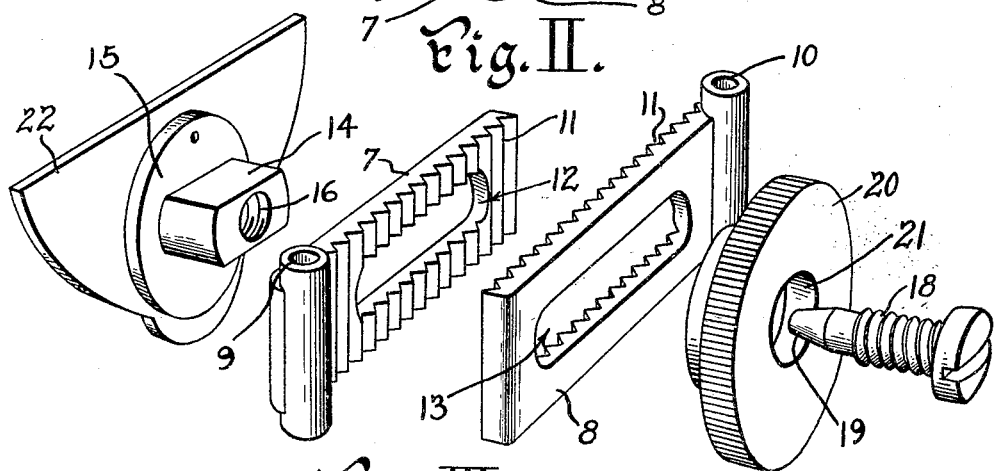
Fig. III.
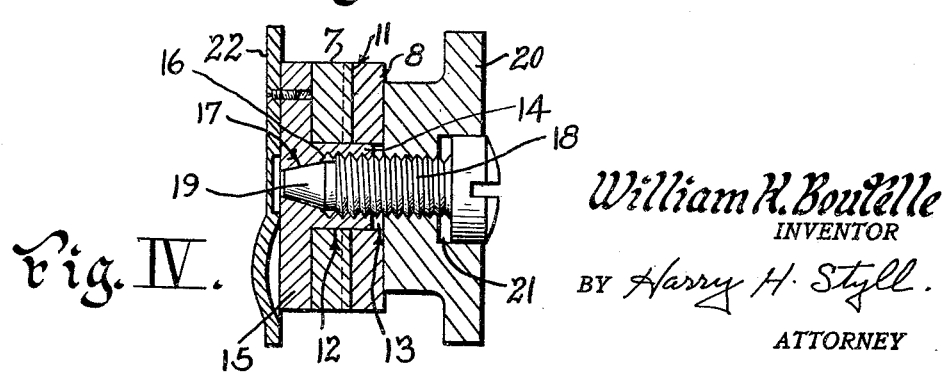
Fig. IV.
William H. Boutelle
INVENTOR
BY Harry H. Styll.
ATTORNEY Patented May 23, 1933

1,910,460

UNITED STATES PATENT OFFICE

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

GOGGLES

Application filed May 5, 1930. Serial No. 449,894.

This invention relates to improvements in goggles and the like, and has particular reference to a goggle used for the purpose of aviation.

The principal object of the invention is to provide improved means whereby a properly centered pair of lenses may be positioned in proper relation to the eyes of the wearer.

Another object of the invention is to provide improved means for regulating the distance between the lenses and for locking the same securely to the regulated distance.

Another object of the invention is to provide a pair of wide vision lenses with means for holding them snugly in relation to the eyes of the wearer.

Another object of the invention is to provide adjustable means on the members connecting the two lenses that may be centered with respect to the lenses after the distance between the same has been fixed, and which when locked in position will not permit the parts to become loose and allow air or wind to enter the eyecups, except as provided for ventilation.

Another object of the invention is to provide simple, efficient and economical means for holding the lenses in adjusted position.

Other objects and advantages of the invention will become apparent from the following description taken in connection with the accompanying drawing, and it will be understood that many changes may be made in the arrangement of parts and details of construction without departing from the spirit of the invention as set forth in the accompanying claims. I, therefore, do not wish to be limited to the exact details shown and described as the preferred forms only have been shown by way of illustration.

Referring to the drawing:

Fig. I is a front elevation of the device embodying the invention.

Fig. II is a fragmentary plan view of the lens connecting means shown in Fig. I.

Fig. III is an enlarged perspective view of the lens connecting means, showing the parts disunited.

Fig. IV is an enlarged sectional view taken on line IV—IV of Fig. I.

Aviators' goggles are designed particularly for high wind resistance and wide angle vision with the elimination of distortion and refractive errors in the lenses. To obtain ideal conditions for the wearer's eyes, these types of lenses are designed with a properly located optical center, and should be held securely before the eyes of the wearer in this centered position. Strong air currents caused by the swift motion of the flyer through the air have, in the past, caused much difficulty in the displacement of lenses. This displacement was caused mostly by the loosening of the lens connecting means which in turn, caused the goggle to fit loosely on the face and permitted the air currents to displace the lenses. In many instances in the past when the connecting means became loose, the air currents have blown the goggles entirely from the face of the aviator, causing much distress and misjudgments which have endangered his life.

It, therefore, is the prime object of this invention to provide improved lens connecting means wherein the goggles may be snugly fitted to the face of the wearer with the lenses in proper position and which, when in adjusted position, will not become loose.

Referring to the drawing in which similar characters of reference are used to denote corresponding parts throughout, a pair of properly centered and designed wide vision lenses 1 are mounted in an eyecup frame 2 having a front flange or lens retaining seat 3. The frame member 2 is shaped in general contour to that of the orbital arch of the wearer's face, and is provided on the side adjacent the face with a resilient face contacting member 4, preferably of rubber or other soft material. The resilient member 4 may be held in the eyecup frame 2 by clamping or may be sewed, cemented or riveted to the inner edge of the frame if desired. The eyecup frames 2 are split at 5 on their temporal side to permit the insertion or removal of the lenses 1. Any suitable securing means 6 may be used, such as clamped or screw locked endpiece projections to secure the split rim 2 together to hold the lenses 1 therein. The eyecup members 2 are connected centrally by two bridging or spacing members 7 and 8, respectively, the member 7 being pivotally connected at 9 to one of the eyecup members, and the member 8 being pivotally connected at 10 to the other of said eyecup members. Each of the bridging or spacing members 7 and 8 are provided with interlocking corrugated faces 11 and are each provided with a longitudinal slot 12 and 13. The slots 12 and 13 are adapted to receive a slide projection 14 formed on the head portion 15 of clamping means which is used to secure the two bridging or spacing members 7 and 8 together. The slide projection 14 is provided with a threaded recess 16 which terminates in a tapered unthreaded portion 17 and is adapted to receive a screw 18. The screw 18 is formed with a reduced tapered end 19 which is adapted to be forced into frictional binding engagement with the tapered face 17 by threading the screw 18 in the recess 16. These tapered contacting faces provide means whereby the screw 18 may be locked in engagement with the projection 14. A binding nut 20 is threaded on the screw 18 previous to its attachment to the projection 14 and is adapted to force the bridging or spacing members 7 and 8 against the head 15 and hold them in binding engagement with each other along their corrugated faces 11. The nut 20 is provided with a counterbored portion 21 by means of which it may be threaded out over the head portion of the screw 18. This is to permit the nut to be loosened sufficiently to allow the bridging or spacing members 7 and 8 to be adjusted longitudinally, without having to disengage the screw member 18 from the projection 14. After the members 7 and 8 have been adjusted, the nut 20 is tightened to hold the parts in adjusted position. The tapered faces 17 and 19 prevent the screw 18 from becoming loose, and provide means for locking the parts against disengagement during the use of the goggle. A plate member 22 is secured to the face of the head 15 to provide a suitable covering for the parts of the bridge connection. The goggle eyecups 2 may be provided with any suitable type of ventilation 23 and may be held on the head of the wearer by any suitable means such as a headband or the like 24.

The adjustment for varying the distance between the centers of the lenses and for fitting the goggle to the face of the wearer is as follows:

The nut 20 is loosened sufficiently to permit the bridging members 7 and 8 to be disunited so that they may be adjusted longitudinally to vary the distance between the lenses 1. When in proper adjusted position, the corrugated faces 11 of the members 7 and 8 are pressed into engagement and are held in adjusted position by tightening the nut 20.

The slide projection 14 is adjustable longitudinally in the slots 12 and 13 previous to the final clamping to permit the head 15 to be centered with respect to the eyecup members 2. At no time during the use of the goggles is it necessary that the screw member 18 be loosened, therefore, the tapered faces 17 and 19 will not become worn from continued use. They are simply forced into binding engagement during the assembly of the goggle in its manufacture, and are not adapted to be disunited after the goggle has once been assembled. It is apparent that the corrugated faces 11, when in binding engagement, will remove all side twist and strain on the nut 20 and will thereby prevent its working loose on the screw member 18. In view of the fact that the screw member 18 is locked with the projection 14 and that the nut member 20 cannot be removed from the screw 18 unless the screw is disengaged from the projection member 14, there is no danger of the eyecups becoming separated during their use.

From the foregoing description, it will be seen that I have provided simple, efficient and inexpensive means for carrying out all the objects of the invention, and that I have provided ready and facile means of adjusting such a goggle to the facial requirements of the wearer, and then locking the parts in such a way as to maintain the said relationship.

Having described my invention, I claim:

1. In a device of the character described, a pair of eyecups each having a hinge pintle thereon, a pair of longitudinally slotted slide members having their respective ends pivotally mounted on the pintles and means to lock the slide members together, said means comprising a member having a slide projection extending within the longitudinally slotted slide members, a support locked to said slide projection and a clamp member on said support.

2. A device of the character described, a pair of eyecups each having a hinge pintle thereon, a pair of longitudinally slotted slide members having their respective ends pivotally mounted on the pintles and means to lock the slide members together, said means comprising a member having a slide projection extending within the longitudinally slotted slide members, a clamp support frictionally locked to said slide projection and a clamp member on said clamp support.

3. In an eye protector mounting, a pair of eyecups each having lugs thereon, pintles supported by the lugs and a pair of slide members having their respective ends pivotally mounted on the pintles, and means to lock the slide members against movement, said means comprising a chuck portion, a support frictionally locked to said chuck portion and a clamp member on said support.

4. In a device of the character described, a pair of lens holding members each having a hinge pintle, a bridge member pivoted to each of said pintles having interlocking face serrations thereon and aligned longitudinal slots therein, a shouldered slide member in the aligned slots having a threaded recess therein and a tapered portion, a screw member in the threaded opening in the slide, having a tapered end adapted to engage the taper in the slide member and a clamp member on said screw member adapted to clamp the bridge members together to interlock the serrated faces.

5. In a device of the character described, a pair of lens holding members each having a hinge pintle thereon, a bridge member pivoted to each of said pintles having interlocking face serrations and aligned longitudinal slots therein, a shouldered slide member in the aligned slots having a connecting member thereon, means on the connecting member adapted to interlock therewith and means on said last named means adapted to secure the bridge members together to interlock the serrated faces.

6. In a device of the character described, a pair of lens holding means, a pair of bridge members overlying each other and each having one end connected to one of the lens holding means and the other end unconnected and each of said bridge members having a longitudinal opening therethrough said openings being aligned, a clamp member having a portion engaging one of the bridge members and a portion extending into the opening therein, a second clamp member having a portion engaging the other bridge member, and securing means connecting the clamp members to lock them against the respective bridge members, each of the said bridge members being slidable upon the clamping means in the longitudinal openings independently of the other to change the distance between the lens holding means and to locate the clamp members in any selected position between said lens holding means within the limits of movement of said bridge members.

7. In a device of the character described, a pair of lens holding means, a pair of bridge members overlying each other and each having one end connected to one of the lens holding means and the other end unconnected and each of said bridge members having a longitudinal opening therethrough, said openings being aligned, a clamp member having a portion engaging one of the bridge members and a portion extending into the opening therein, a second clamp member having a portion engaging the other bridge member, securing means connecting the clamp members to lock them against the respective bridge members, each of the said bridge members being slidable upon the clamping means in the longitudinal openings independently of the other to change the distance between the lens holding means and to locate the clamp members in any selected position between said lens holding means within the limits of movement of said bridge members, means to separate the clamp members to free the bridge members for longitudinal movement with respect to each other, and stop means to retard said separation before the parts are moved out of operative alignment.

8. In a device of the character described, a pair of lens holding means, a pair of bridge members overlying each other and each having one end connected to one of the lens holding means and the other end unconnected and each of said bridge members having a longitudinal opening therethrough said openings being aligned, a clamp member having a portion engaging one of the bridge members and a portion extending into the opening therein, a second clamp member having a portion engaging the other bridge member, securing means connecting the clamp members to lock them against the respective bridge members, each of the said bridge members being slidable upon the clamping means in the longitudinal openings independently of the other to change the distance between the lens holding means and to locate the clamp members in any selected position between said lens holding means within the limits of movement of said bridge members, means to separate the clamp members to free the bridge members for longitudinal movement with respect to each other, stop means to retard said separation before the parts are moved out of operative alignment, and operative means for moving the stop means to disassemble the parts.

9. In a device of the character described, a pair of lens holding members, a bridge member connected to each of the lens holding members at one end and having the other end unconnected, said bridge members having interlocking face serrations and having aligned longitudinal slots therein, a slide member having a shoulder extending into the aligned slots having interengaging means thereon, and clamping means engaging a bridge member and having means for interengaging the said interengaging means on the shoulder and adapted to secure the bridge members together to interlock the serrated faces.

10. In a device of the character described, a pair of lens holding members, a pair of bridge members each having one end connected to a lens holding member and the other end unconnected, said bridge members having interlocking face serrations thereon and aligned longitudinal slots therein, a shouldered slide member in the aligned slots having a threaded recess therein and a tapered portion, a screw member in the threaded opening in the slide having a tapered end adapted to engage the taper in the slide member and a clamp member on said screw member adapted to clamp the bridge members together to interlock the serrated faces.

11. In a device of the character described, a pair of eye cups, a pair of bridge members each having one end connected to an eye cup and the other end unconnected, said members overlying each other, means for holding the said bridge members in aligned position whereby they may be moved longitudinally with respect to each other, said aligning means having guide means for the bridge members for said longitudinal movement and having a threaded recessed portion with a conical unthreaded bottom, a threaded clamp supporting member extending into said recess and having a conical end frictionally engaging the conical bottom of the recessed portions and clamp means on said support for clamping the bridge members together, the said conical connection of the support preventing the loosening of the support during the operation of the clamp means.

12. In a device of the character described, a pair of eye cups, a pair of bridge members each having one end connected to an eye cup and the other end unconnected, said members having longitudinal slots and overlying each other, a member having a portion to engage one of said bridge members and having a portion extending into said slots, said portion having a threaded recess with a conical bottom, a threaded clamp support extending into said recess and having a cone end frictionally engaging the conical bottom of said recessed portion, and a clamp member on said clamp support engaging one of said bridge members and clamping the bridge members together, said bridge being longitudinally movable on said portion extending into the slots on loosening the said clamp, and said support being held from loosening by the frictional contact of the said conical connection.

WILLIAM H. BOUTELLE.